United States Patent
Eriksson

[11] Patent Number: 5,725,058
[45] Date of Patent: Mar. 10, 1998

[54] HAND-HELD RECIPROCATING TOOL

[75] Inventor: Rolf Eriksson, Hagersten, Sweden

[73] Assignee: Dentatus AB, Hagersten, Sweden

[21] Appl. No.: 532,790

[22] PCT Filed: Apr. 19, 1994

[86] PCT No.: PCT/SE94/00348

§ 371 Date: Oct. 17, 1995

§ 102(e) Date: Oct. 17, 1995

[87] PCT Pub. No.: WO94/23879

PCT Pub. Date: Oct. 27, 1994

[30] Foreign Application Priority Data

Apr. 19, 1993 [SE] Sweden .................. 9301273-0

[51] Int. Cl.[6] .................................................. B23D 49/04
[52] U.S. Cl. ..................... 173/114; 74/60; 30/392; 30/394
[58] Field of Search ................. 173/114; 74/60; 30/392, 393, 394, 272.1, 273, 275.4, 277.4

[56] References Cited

U.S. PATENT DOCUMENTS

| | | | |
|---|---|---|---|
| 2,671,606 | 3/1954 | Ricardo | 74/60 |
| 2,793,661 | 5/1957 | Olson | 30/393 |
| 2,824,455 | 2/1958 | Ristow et al. | 74/60 |
| 3,461,732 | 8/1969 | Gregory | 74/60 |
| 4,114,270 | 9/1978 | Jansen-Herfeld et al. | 30/394 |
| 4,396,357 | 8/1983 | Hartley | 74/60 |
| 4,537,364 | 8/1985 | Schmid et al. | 74/60 |
| 5,269,193 | 12/1993 | Rabinow | 74/60 |
| 5,450,925 | 9/1995 | Smith et al. | 30/394 |
| 5,555,626 | 9/1996 | Fuchs | 30/392 |

FOREIGN PATENT DOCUMENTS 149803  4/1955  Sweden .

*Primary Examiner*—Joseph J. Hail, III
*Assistant Examiner*—Jay A. Stelacone
*Attorney, Agent, or Firm*—Young & Thompson

[57] ABSTRACT

Hand tool with an apparatus housing (2) in which the are movably mounted a rotary portion (8) and a reciprocating slide (10) non-rotatably but displaceably mounted in the housing, said slide serving as a holder for a tool (12). The rotary portion (8) has an oblique shaft (32) with a rolling bearing device (36) mounted thereon, which converts the rotation of the rotary portion into a reciprocating movement of the displaceable portion (10). The rolling bearing device (36) comprises one or two rolling bearings with outer ring surface areas, via which the bearing device is in direct driving contact with a driver element (52) at the end of the displaceably mounted slide (10). The driver element (52) is in direct engagement with the outer rings (48, 50) of the bearing device via opposite lateral surfaces (54, 56).

12 Claims, 3 Drawing Sheets

HAND-HELD RECIPROCATING TOOL

BACKGROUND OF THE INVENTION

1. Field of the Invention

The present invention relates to a hand tool with an apparatus housing in which two main portions are movably mounted, namely a rotary portion which is mounted in the housing by means of one or more bearing means, and a portion, which is non-rotatably but displaceably mounted in the housing, which is drivingly connected to the rotary portion, and is disposed to perform a reciprocating movement in its longitudinal direction as well as serving as a fixing means for a working tool, the rotary portion having a shaft oblique relative to the rotational axis of the rotary portion, on said oblique shaft there being mounted a motion transmitting means connected to an adjacent portion of the displaceable portion, said motion transmitting means transmitting, in the manner of a wobbler, the rotational movement of the rotary portion into a reciprocating movement of the displaceable portion.

2. Description of the Related Art

Hand tools of the above mentioned type are previously known, see e.g. U.S. Pat. No. 2,824,455 and U.S. Pat. No. 4,114,270, which describe a portable electrically driven hand saw and a hand-held apparatus for sawing slaughterhouse products.

In the hand-held electric saw described in U.S. Pat. No. 2,824,455, the motion is transmitted between the motor-driven rotating portion and the reciprocating portion (in which the saw-blade is fixed) by motion transmitting means. The motion transmitting means consists of an arm element engaging the reciprocating portion, said element being mounted on the oblique crank with the aid of a ball bearing. The arm element consists of an annular housing surrounding the ball bearing with a housing portion projecting radially from the ball bearing in which there is solidly mounted a shank with a spherical head which engages in an engagement portion on the underside of the reciprocating part. A significant disadvantage of such a motion transmitting means (between the rotary portion and the reciprocating portion) is, however, that the motion transmitting means extends significantly radially from the oblique shaft.

This is because the arm element housing surrounding the ball bearing with the projecting housing portion, takes up in this context a significant space between the rotary part and the reciprocating part. These two parts can therefore not be mounted as close together as would be desirable in order to minimize the dimensions of the hand tool apparatus housing.

Especially when a hand-held power tool of the type in question is to be used for polishing, sanding, filing and similar operations in confined spaces, and when access to the place to be worked is limited or has small dimensions, it is essential that the dimensions, especially the transverse dimensions (the diameter), of the apparatus housing be kept down as much as possible.

SUMMARY OF THE INVENTION

The present invention therefore is intended to further develope hand tools of the type described by way of introduction, and to provide a hand tool, the apparatus housing of which has a small transverse dimension (maximum diameter), so that the hand tool may be easily handled.

The design should also be simple and reliable, and in particular the motion transmitting means should be compact and consist of few structurally simple machine elements which can be of standard type.

The hand tool should also be constructed so that the components subjected to wear should be few and easily replaced. The moving parts should further be so constructed and assembled that they engage without any undesirable play, thus eliminating rattle. The moving parts should also be able to be easily lubricated or be provided with the required lubrication upon assembly.

The above purposes are achieved effectively according to the invention by virtue of the fact that the motion transmitting means is a rolling bearing device mounted on the oblique shaft and comprising one or two rolling bearings, said bearing device having outer ring surface areas via which the device is in direct driving contact with the end of the adjacent portion of the displaceable portion, that the displaceable portion has in the area of said end an end section with a flat lateral surface and an essentially circle segment-shaped cross section, at the end of said end section there being a preferably tooth-like driver element projecting from the flat lateral surface and arranged in direct engagement with the outer ring(s), said driver element having opposite lateral surfaces by means of which it is in direct contact with the outer ring surface areas of the bearing device cooperating therewith.

The basic idea of the invention can thus be said to be that the reciprocating displaceable portion, by means of a drive element in the form of a laterally directed end projection, is in direct driving contact with the surface areas of the outer ring(s) of the respective rolling bearing forming the rolling bearing device.

This design completely eliminates the need of a surrounding housing or annular means about the rolling bearing in question. By directly utilizing the outer ring of the rolling bearing(s) for drive transmission to the driver element of the displaceable portion provides a very simple (few component parts) motion transmitting mechanism. In the design selected, the space requirement for the motion transmitting means (i.e. the rolling bearing/bearings) is also minimized. This means in turn that relatively large bearings can be used in the motion transmitting chamber of the apparatus housing without making the apparatus housing excessively large. The relation between the dimensions of the rolling bearing device and the mass, which must be moved/accelerated in the motion transmission, can thus also be improved over previously known designs.

In the attached dependent claims, there are specified further developing features of suitable embodiments of the invention.

The displaceable portion is suitably a slide with, firstly, a forward round slide portion, secondly, an intermediate portion (with a non-round cross section) which extends to the end section with a flat lateral surface. By virtue of the intermediate portion, the slide is non-rotatably mounted in a non-rotatable bearing sleeve in the apparatus housing.

The intermediate portion suitably consists of a slide portion defined by a cylindrical lateral surface and a flat surface, with a cross section in the form of a circle segment. The bearing sleeve has at its end, a slide guide portion cooperating with the intermediate portion of the slide with a flat guide surface. By virtue of the fact that the flat surface of the intermediate portion is in contact with this guide surface, the slide is prevented from rotating in the bearing sleeve.

In order to minimize the risk of wear and heating caused by friction of the round slide portion of the slide, the bearing sleeve can be provided with a special lubricant chamber, which surrounds the round slide portion. Suitable lubricant, such as oil, can be inserted into the lubricant chamber via a radial channel through the bearing sleeve.

A particularly simple embodiment of the rolling bearing device is achieved if it consists of a pair of preferably single-row ball bearings, which are held tightly together side by side with a spacer ring between them on the oblique shaft. This spacer ring creates an annular space between the outer rings of the bearings, into which the driver element of the reciprocating portion can engage. The two ball bearings used in this embodiment can be of wellknown standard type, making the design inexpensive.

An alternative, also very simple, embodiment of the rolling bearing device is achieved if it quite simply consists of a preferably two-row ball bearing, which is secured, by means of a pressure washer bearing against the inner ring of the bearing on the oblique shaft. In this case, the outer ring of the ball bearing is provided with a circumferential engaging groove for the driver element of the reciprocating portion.

In order to avoid unnecessary inertial forces and vibrations when operating, it is advisable to arrange the oblique shaft at the end of the rotating portion in such a manner, and that the rolling bearing device be mounted on the oblique shaft in such a manner that the center of mass of the bearing device will lie at the point of intersection of the longitudinal axis of the rotating portion and the longitudinal axis of the oblique shaft.

BRIEF DESCRIPTION OF THE DRAWINGS

The invention will now be described and explained further below with reference to several examples shown in the accompanying drawings of a hand tool according to the invention.

DESCRIPTION OF THE EXAMPLES

Figure 2:
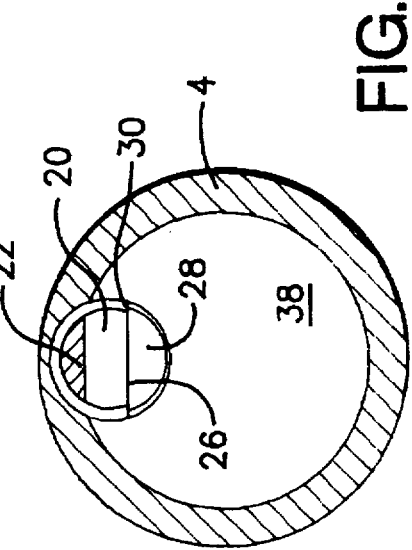
FIG. 2 shows a cross section along the line II—II in FIG. 1.
Figure 1:
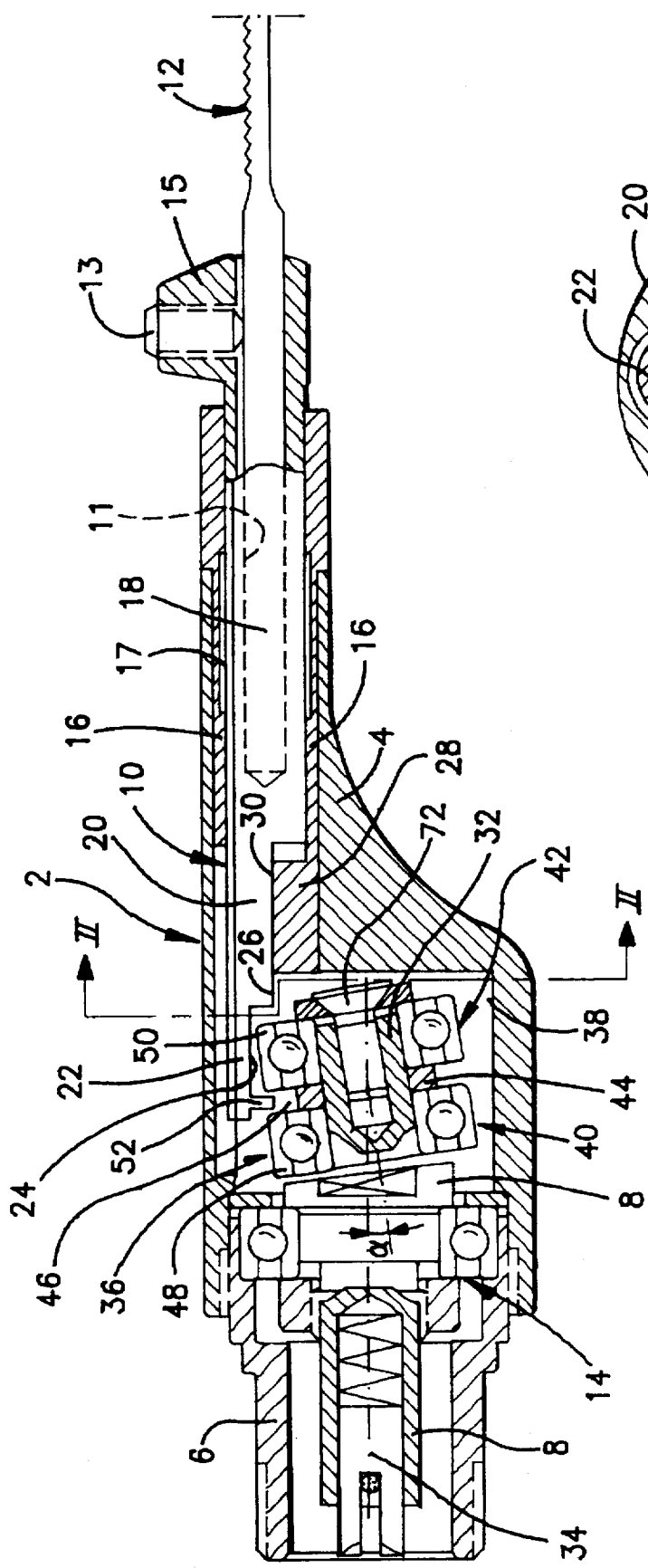
FIG. 1 shows a longitudinal section through a first embodiment of the hand tool according to the invention.

Reference is now made to the first embodiment of the hand tool according to the invention shown in FIGS. 1 and 2. This hand tool comprises an apparatus housing 2 consisting of a forward portion 4 and a rear portion 6 connected thereto. In the apparatus housing 2 there are rotatably mounted, on the one hand, a rotary portion 8 and, on the other hand, a portion 10 drivingly connected to the portion 8 and serving as an attachment means for a working tool, e.g. a file 12. The shaft of the file 12 is fixed in a bore 11 in the portion 10 by means of a lock screw 13 which is screwed into a fixing head at the end of the portion 10. The rotary portion 8 is mounted in the house portion 6 by means of a rolling bearing 14, in this case a single-row ball bearing. The rotary portion 8 is imparted rotation by a drive means (not shown) of conventional type, e.g. an electric motor or other drive means. The portion 10 is non-rotatable, but is displaceably mounted in a bearing sleeve 16 fixed in the apparatus housing. The displaceable portion 10 is disposed to be able to perform a reciprocating movement in its longitudinal direction in the housing 2. As can be seen in FIG. 1, the displaceable portion 10 is made as a slide comprising, firstly, a front round slide portion 18 and, secondly, an intermediate portion 20 connected thereto. This intermediate portion extends to the end section 22 of the slide 10, which has a flat lateral surface 24 on the bottom. The intermediate portion 20 has, as can be seen in FIG. 2, a non-round cross section and has a flat surface 26 on the bottom. The intermediate portion 20, which in this case is a slide portion with a circle segment cross section, has at its top a cylindrical surface and a flat surface 26 at the bottom. The bearing sleeve 26 has, at its end facing the end section 22 of the slide, a slide guide portion 28 cooperating with the flat lower surface 26 of the intermediate portion 20 and having a flat upper guide surface 30. By virtue of the fact that the flat surface 26 of the intermediate portion 20 is in contact with the guide surface 30 of the bearing sleeve 16, the slide 10 is non-rotatably mounted in the bearing sleeve 16, which is in turn non-rotatably mounted in the housing portion 4.

In order to reduce friction between the slide 10 and the bearing sleeve 16, the bearing sleeve can be provided with a chamber 17 containing lubricant and which surrounds the round slide portion 18.

As can be seen in FIG. 1, the rotary portion 8 has at its righthand end as seen in FIG. 1 a shaft 32 obliquely directed at an angle α relative to the longitudinal axis 34 of the rotary portion 8. On the shaft 32 there is mounted a motion transmitting means 36 drivingly connected to the end section 22 of the slide 10, said oblique shaft being mounted in a motion transmitting chamber 38 in the apparatus housing 2. This motion transmitting means 36 converts, in a manner similar to a wobbler, the rotation of the rotary portion 8 into reciprocating movement of the slide 10.

In the embodiment shown in FIG. 1, the rolling bearing device 36 consists of a pair of single-row ball bearings 40 and 42, which are held tightly, with an intermediate spacer ring 44, side by side on the oblique shaft 32. The spacer ring 44 creates an annular space 46 between the ball bearings 40 and 42 and between their outer rings 48 and 50.

In order to produce the reciprocating movement of the slide 10, the slide has at its end section 22, at the end of the flat lateral surface 24, a driver element 52 projecting straight out from the surface 24, which in the manner of a tooth engages in the annular space 46 between the outer rings 48,50. The driver element 52 thus stands with both its opposite side surfaces 54 and 56 in direct contact with the cooperating adjacent surface areas of the side surfaces on the outer rings 48 and 50 of the bearings 40,42.

Figures 4, 5:
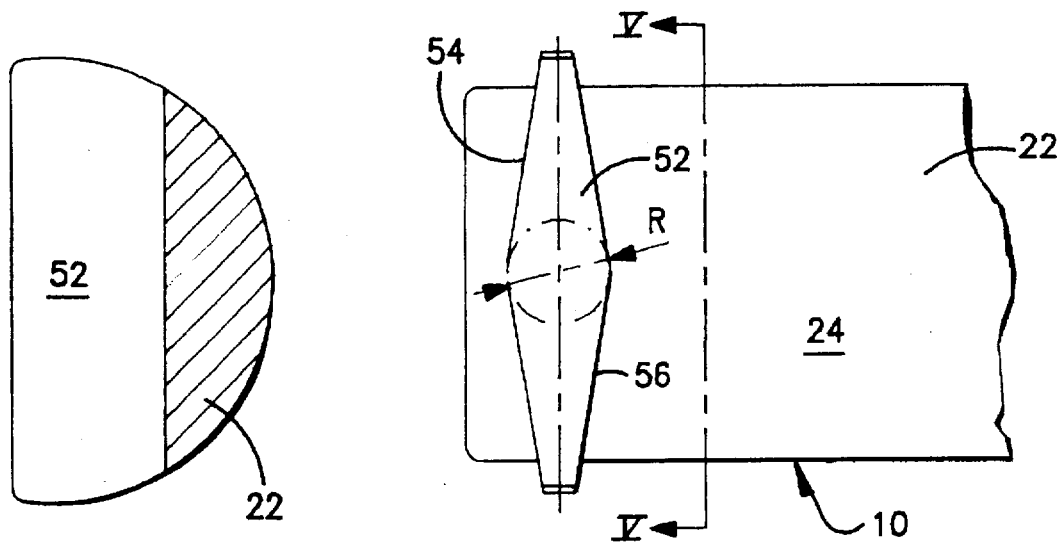
FIG. 4 shows a view from below of the driver element according to FIG. 3.
FIG. 5 shows a cross section along the line V—V in FIG. 4.

By making the tooth-like driver element 52 thin (in the longitudinal direction of the slide 10, see FIG. 4), it is possible to make the driver element 52 engage the space 46 without any play relative to the outer rings 48,50, regardless of the momentary rotational position of the bearing device 36. The absence of play in the engagement eliminates undesirable rattling. For the "bent" lateral surfaces 54 and 56, the transitional area between their respective bevelled halves should be made with a radius of curvature R (see FIG. 4). The transitional areas on both sides of the element 52 can then be parts of a circular cylindrical or spherical surface.

Wear tests have provided very good results. Small radial movements (with sliding friction) between the driver element 52 and the outer rings 48 and 50 of the bearings produce very small losses, which contributes to the high efficiency. It should thus be possible to use small, light power sources.

Figure 3:
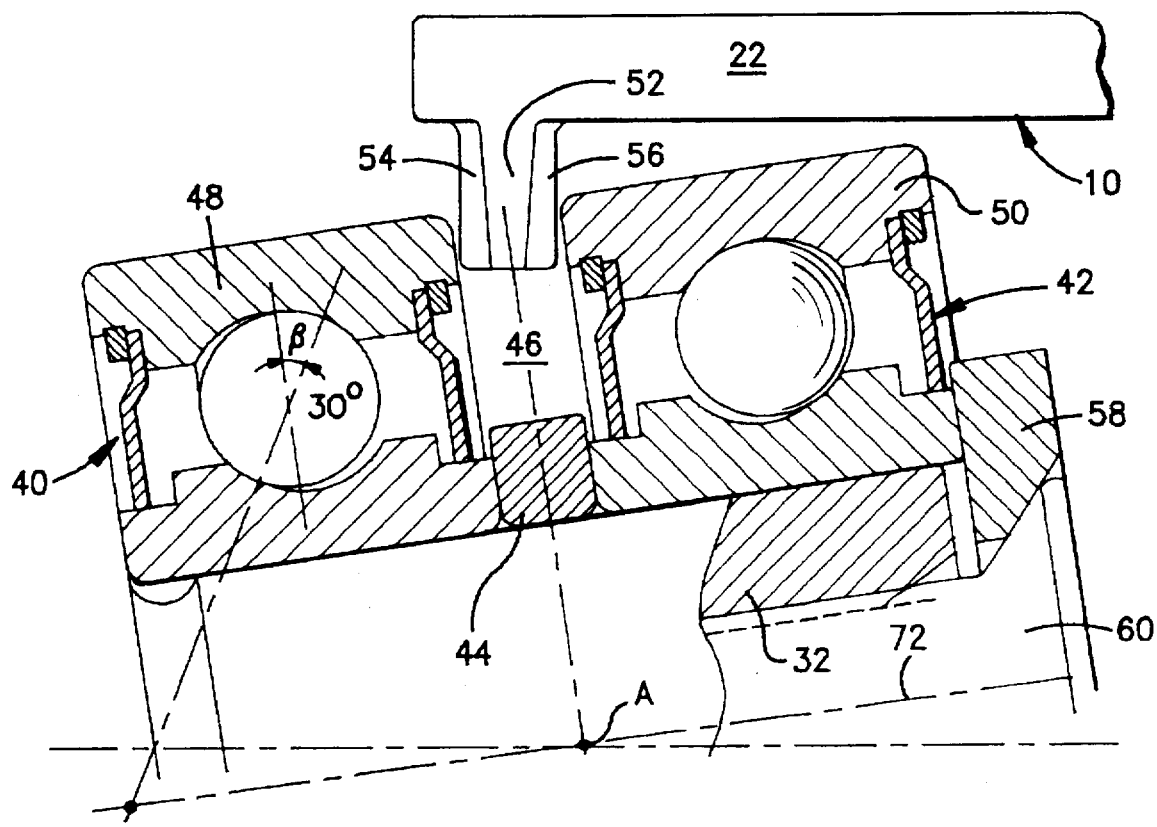
FIG. 3 shows in partial longitudinal section and on a larger scale, the area of engagement between the rolling bearing device and the driver element of the displaceable portion which is engaged therein, in an embodiment similar to that shown in FIG. 1.

Both FIGS. 1 and 3 show the slide 10 with the driver element 52 in one end position. As is particularly evident from FIG. 3, there will be a lateral displacement of the outer rings 48,50 as a result of the "prying" effect of the element 52. In the type of ball bearings shown in FIG. 3, one can calculate that the radius of curvature of the races of the bearings is approximately 10% greater than the radius of the balls of the ball bearing. As can be seen in FIG. 3, a contact angle β is obtained between the ball and the race, which is approximately 30°. The balls, in this way, "climb up" the respective races, and this is advantageous for the operation of the bearings. The rolling bearings 40, 42 are tightly fixed to the oblique shaft 32 by means of a pressure washer 58 bearing against the inner ring of the bearing 42, said washer 58 being screwed tightly to the oblique shaft 32 by means of the screw 60.

Figure 6:
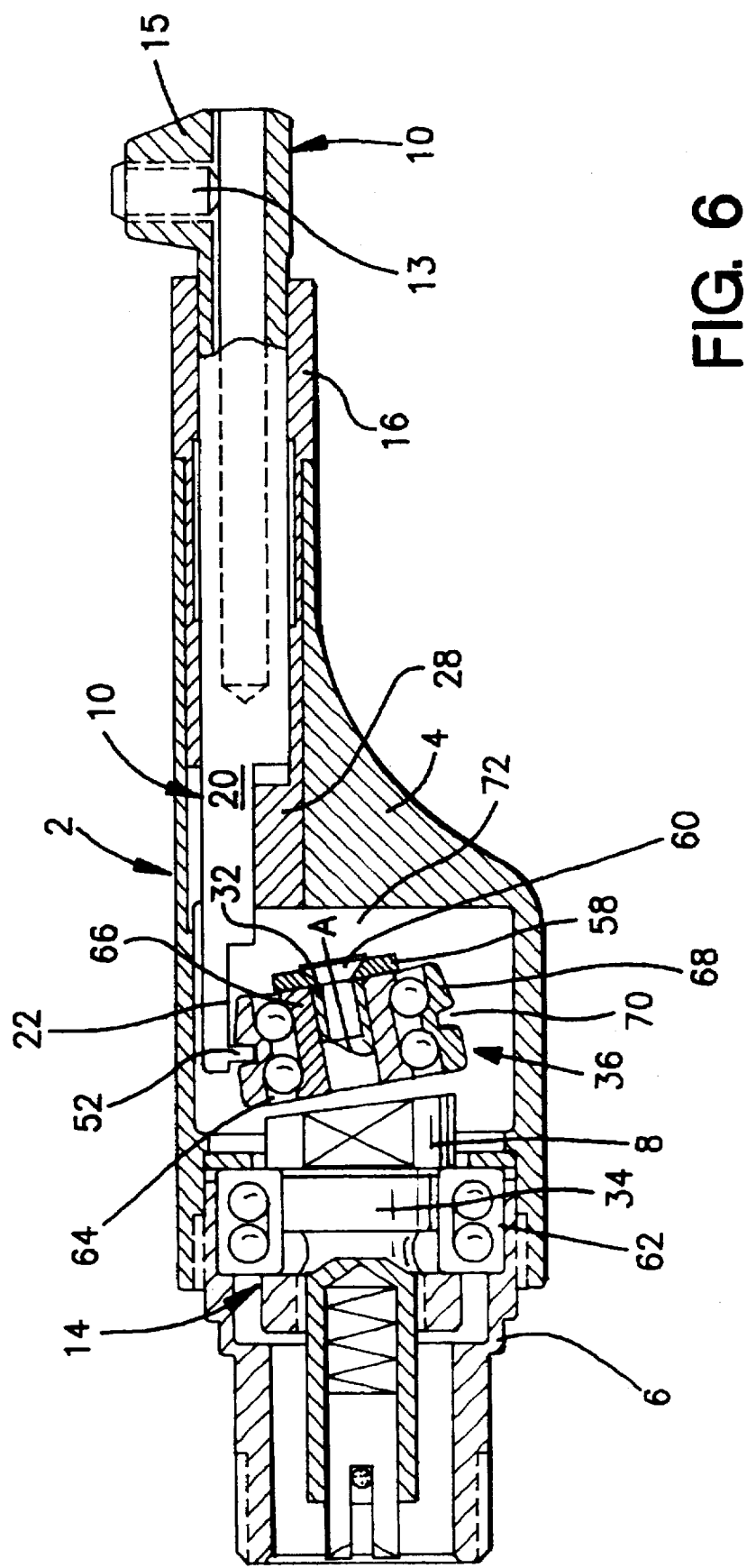
FIG. 6 shows finally a longitudinal section through a second embodiment of the hand tool according to the invention.
Figure 6:
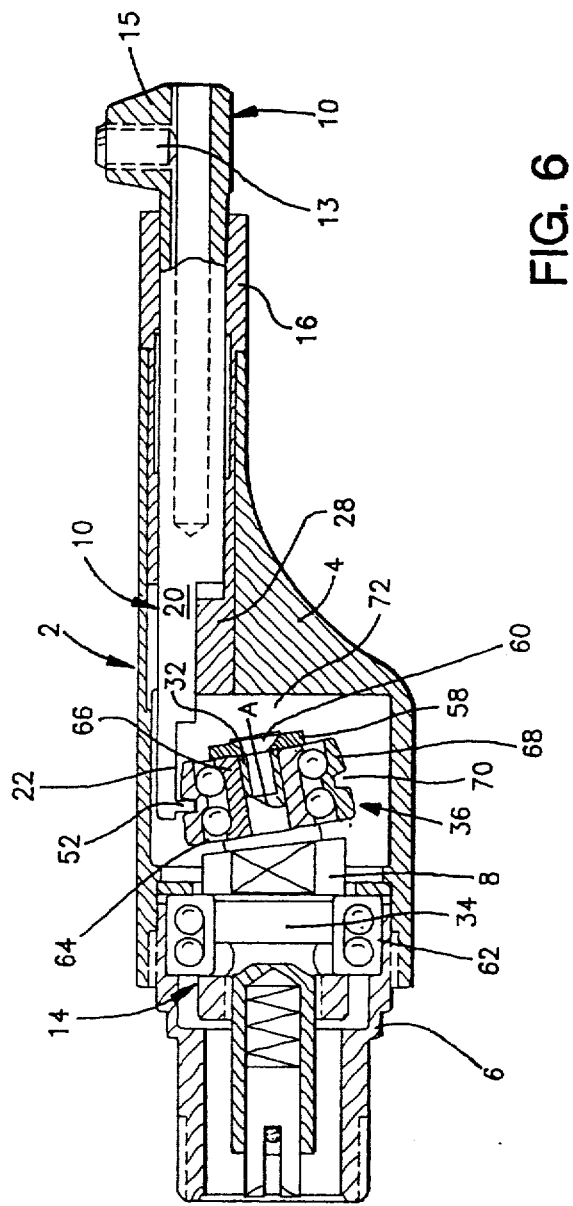

FIG. 6 shows a longitudinal section through a second embodiment of the hand tool according to the invention. This embodiment differs from the one shown in FIG. 1 primarily in the design of the rolling bearing device 36. The bearing means 14 also differs in this case from that shown in FIG. 1, since the bearing means in this case is a two-row ball bearing 62. In other respects, the embodiment according to FIG. 6 completely agrees with that in FIG. 1, and therefore the rest of the components of the hand tool have been provided with the same reference numerals as in FIG. 1. These components, which are known from the embodiment according to FIG. 1, will not be described here since they completely agree in their design and function with the components described in connection with FIG. 1. The description of the embodiment according to FIG. 6 will therefore be essentially limited to a description of the rolling bearing device 36.

The rolling bearing device consists in this case of a two-row ball bearing 64 which, by means of the pressure washer 58 abutting against the inner ring 66 of the bearing, is securely mounted on the oblique shaft 32 by means of the screw 60. In the outer ring 68 of the ball bearing 64, there is in this case a circumferential engagement groove 70, in which the slide 10 engages with its driver element 52. The circumferential engagement groove 70 in the outer ring 68 corresponds in this case to the annular space 46 of the rolling bearing device 36 in the embodiment of FIG. 1. In this case as well, the driver element 52, by its opposite lateral surfaces 54,56, is in direct contact with cooperating surface areas of the outer ring of the bearing device. These surface areas consist in this case of surface areas of the lateral walls of the engagement groove 70. The embodiment according to FIG. 6 thus functions in principle in the same manner as the embodiment according to FIG. 1.

For the two embodiments according to FIGS. 1 and 6, the oblique shaft 32 is so arranged at the end of the rotary portion 8, and the rolling bearing device 36 is so mounted on the oblique shaft 32, that the center of mass A of the bearing device lies at the point of intersection between the longitudinal axis 34 of the rotary portion 8 and the longitudinal axis 72 of the oblique shaft 32.

In general, it is important in a hand tool according to the invention, regardless of the embodiment, that the components which during operation are subjected to wear, i.e. the slide 10, the rolling bearing device 36 and the bearing sleeve 16, be so designed and mounted that they can be easily disassembled and replaced. These components are also those components which can be made or bought at a relatively low price.

I claim:

1. A hand tool comprising:

a rotatable portion having a shaft which is oblique relative to a rotational axis of said rotatable portion;

a non-rotatable portion having a projection extending therefrom for being driven by said shaft;

two annular ball races having an outer surface which extends around said shaft and has an annular channel therein, said projection engaging said channel so as to impart reciprocating longitudinal motion to said non-rotatable portion when said rotatable portion rotates.

2. The hand tool of claim 1, wherein said outer surface comprises an outer ring for said two annular ball races, and wherein said annular channel is a groove in said outer ring.

3. The hand tool of claim 1, wherein said outer surface comprises two outer rings, one for each of said two annular ball races, and wherein said annular channel is a gap between said two outer rings.

4. Hand tool with an apparatus housing (2) containing:

a rotary portion (8) mounted in the housing by bearing means (14), the rotary portion (8) having an oblique shaft (32) which lies at an angle (α) relative to a rotational axis (34) of the rotary portion (8), a motion transmitting means (36) being mounted to the oblique shaft (32), the motion transmitting means (36) being a rolling bearing device comprising a pair of preferably one-row ball bearings (40, 42) attached with pretension to the oblique shaft (32) and separated by an intermediate spacer ring (44), the spacer ring (44) producing an annular space (46) between outer rings 50) of the two bearings (40, 42); and a reciprocal portion (10) having an end section (22) comprising a flat lateral surface (24) from which there extends a tooth-like driver element (52) having opposite lateral surfaces (54, 56), the end section (22) having an essentially circle segment-shaped cross section, the reciprocal portion (10) being non-rotatable but movable linearly in a longitudinal direction in the housing, the reciprocal portion (10) also serving as a fixing means for a working tool (12); wherein said driver element (52) is arranged to penetrate the annular space (46) such that the opposite lateral surfaces (54, 56) contact cooperating surface areas of the outer rings (48, 50); and rotation of the motion transmitting means (36) about the rotational axis (34) results in a wobbling motion of the outer rings (48, 50), which wobbling motion is translated into linear reciprocal motion of the driver element (52) and the reciprocal portion (10).

5. Hand tool according to claim 4, wherein the reciprocal portion is a slide (10), comprising, firstly, a forward round slide portion (18) and, secondly, an intermediate portion (20) adjacent thereto and having a non-round cross section, said intermediate portion extending up to the end section (22) with a flat lateral surface (24), the slide (10), via the intermediate portion (20), being non-rotatably mounted in a bearing sleeve (16) solidly fixed in the apparatus housing (2).

6. Hand tool according to claim 5, wherein the intermediate portion (20) is a slide portion with a cross sectional shape comprising an arc and a line segment and which has a cylindrical lateral surface and a flat surface (26), the bearing sleeve (16) having its end directed towards the rolling bearing device, a slide guide portion (28) cooperating with the intermediate portion (20) of the slide and having a flat guide surface (30) against which the flat surface (26) of the intermediate portion lies, thus preventing the slide from rotating in the bearing sleeve.

7. Hand tool according to claim 5, wherein a portion of the bearing sleeve (16) which houses the round slide portion (18) of the slide comprises a lubricant chamber (17) which surrounds the round slide portion.

8. Hand tool according to claim 4, wherein the oblique shaft (32) is so arranged at an end of the rotary portion (8), and the roller bearing device is so mounted on the oblique shaft, that a center of mass (A) of the bearing device lies at an intersection of the rotational axis (34) of the rotary portion (8) and a longitudinal axis (72) of the oblique shaft (32).

9. Hand tool with an apparatus housing (2) containing:
  a rotary portion ( 8 ) mounted in the housing by bearing means (14), the rotary portion (8) having an oblique shaft (32) which lies at an angle ($\alpha$) relative to a rotational axis (34) of the rotary portion (8), a motion transmitting means (36) being mounted to the oblique shaft (32), the motion transmitting means (36) being a rolling bearing device comprising a preferably two-row ball bearing (64) held on the oblique shaft (32) by a pressure washer (58) which bears against an inner ring (66) of the bearing, an outer ring (68) of the bearing having a circumferential engagement groove (70); and
  a reciprocal portion (10) having an end section (22) comprising a flat lateral surface (24) from which there extends a tooth-like driver element (52) having opposite lateral surfaces (54, 56), the end section (22) having an essentially circle segment-shaped cross section, the reciprocal portion (10) being non-rotatable but movable linearly in a longitudinal direction in the housing, the reciprocal portion (10) also serving as a fixing means for a working tool (12); wherein said driver element (52) is arranged to penetrate the groove (70) in the outer ring (68) such that the opposite lateral surfaces (54, 56) contact cooperating surface areas of the groove (70); and rotation of the motion transmitting means (36) about the rotational axis (34) results in a wobbling motion of the outer ring (68), which wobbling motion is translated into linear reciprocal motion of the driver element (52) and the reciprocal portion (10).

10. Hand tool according to claim 9, wherein the reciprocal portion is a slide (10), comprising, firstly, a forward round slide portion (18) and, secondly, an intermediate portion (20) adjacent thereto and having a non-round cross section, said intermediate portion extending up to the end section (22) with a flat lateral surface (24), the slide (10), via the intermediate portion (20), being non-rotatably mounted in a bearing sleeve (16) solidly fixed in the apparatus housing (2).

11. Hand tool according to claim 10, wherein the intermediate portion (20) is a slide portion with a cross sectional shape comprising an arc and a line segment and which has a cylindrical lateral surface and a flat surface (26), the bearing sleeve (16) having its end directed towards the rolling bearing device, a slide guide portion (28) cooperating with the intermediate portion (20) of the slide and having a flat guide surface (30) against which the flat surface (26) of the intermediate portion lies, thus preventing the slide from rotating in the bearing sleeve.

12. Hand tool according to claim 10, wherein a portion of the bearing sleeve (16) which houses the round slide portion (18) of the slide comprises a lubricant chamber (17) which surrounds the round slide portion.

* * * * *

UNITED STATES PATENT AND TRADEMARK OFFICE
CERTIFICATE OF CORRECTION

PATENT NO. : 5,725,058
DATED : March 10, 1998
INVENTOR(S) : Rolf Eriksson

It is certified that error appears in the above-identified patent and that said Letters Patent is hereby corrected as shown below:

The title page, showing an illustrative figure, should be deleted and substitute therefor the attached title page.

Delete Drawing Sheets 1 and 3, and substitute therefor the Drawing Sheets, consisting of FIGS. 1-2 and 6, as shown on the attached pages.

Signed and Sealed this

Sixteenth Day of June, 1998

Attest:

BRUCE LEHMAN

Attesting Officer

Commissioner of Patents and Trademarks

United States Patent
Eriksson

[11] Patent Number: 5,725,058
[45] Date of Patent: Mar. 10, 1998

[54] HAND-HELD RECIPROCATING TOOL

[75] Inventor: Rolf Eriksson, Hagersten, Sweden

[73] Assignee: Dentatus AB, Hagersten, Sweden

[21] Appl. No.: 532,790

[22] PCT Filed: Apr. 19, 1994

[86] PCT No.: PCT/SE94/00348

§ 371 Date: Oct. 17, 1995

§ 102(e) Date: Oct. 17, 1995

[87] PCT Pub. No.: WO94/23679

PCT Pub. Date: Oct. 27, 1994

[30] Foreign Application Priority Data

Apr. 19, 1993 [SE] Sweden .................. 9301273-0

[51] Int. Cl.[6] ............................................. B23D 49/04
[52] U.S. Cl. .............................. 173/114; 74/60; 30/392; 30/394
[58] Field of Search .................... 173/114; 74/60; 30/392, 393, 394, 272.1, 273, 275.4, 277.4

[56] References Cited

U.S. PATENT DOCUMENTS

| | | | |
|---|---|---|---|
| 2,671,606 | 3/1954 | Ricardo | 74/60 |
| 2,793,661 | 5/1957 | Olson | 30/393 |
| 2,824,455 | 2/1958 | Ristow et al. | 74/60 |
| 3,461,732 | 8/1969 | Gregory | 74/60 |
| 4,114,270 | 9/1978 | Jansen-Herfeld et al. | 30/394 |
| 4,396,357 | 8/1983 | Hartley | 74/60 |
| 4,537,364 | 8/1985 | Schmid et al. | 74/60 |
| 5,269,193 | 12/1993 | Rabinow | 74/60 |
| 5,450,925 | 9/1995 | Smith et al. | 30/394 |
| 5,555,626 | 9/1996 | Fuchs | 30/392 |

FOREIGN PATENT DOCUMENTS 149803  4/1955  Sweden .

Primary Examiner—Joseph J. Hail, III
Assistant Examiner—Jay A. Stelacone
Attorney, Agent, or Firm—Young & Thompson

[57] ABSTRACT

Hand tool with an apparatus housing (2) in which there are movably mounted a rotary portion (8) and a reciprocating slide (10) non-rotatably but displaceably mounted in the housing, said slide serving as a holder for a tool (12). The rotary portion (8) has an oblique shaft (32) with a rolling bearing device (36) mounted thereon, which converts the rotation of the rotary portion into a reciprocating movement of the displaceable portion (10). The rolling bearing device (36) comprises one or two rolling bearings with outer ring surface areas, via which the bearing device is in direct driving contact with a driver element (52) at the end of the displaceably mounted slide (10). The driver element (52) is in direct engagement with the outer rings (48, 50) of the bearing device via opposite lateral surfaces (54, 56).

12 Claims, 3 Drawing Sheets

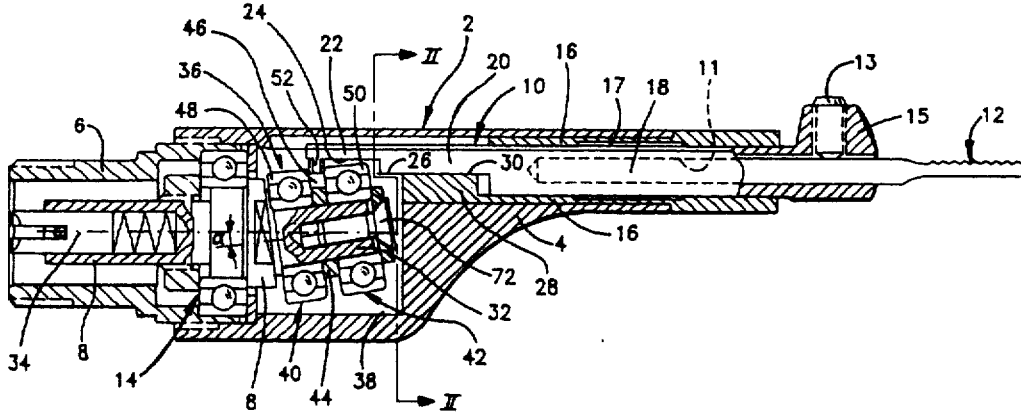

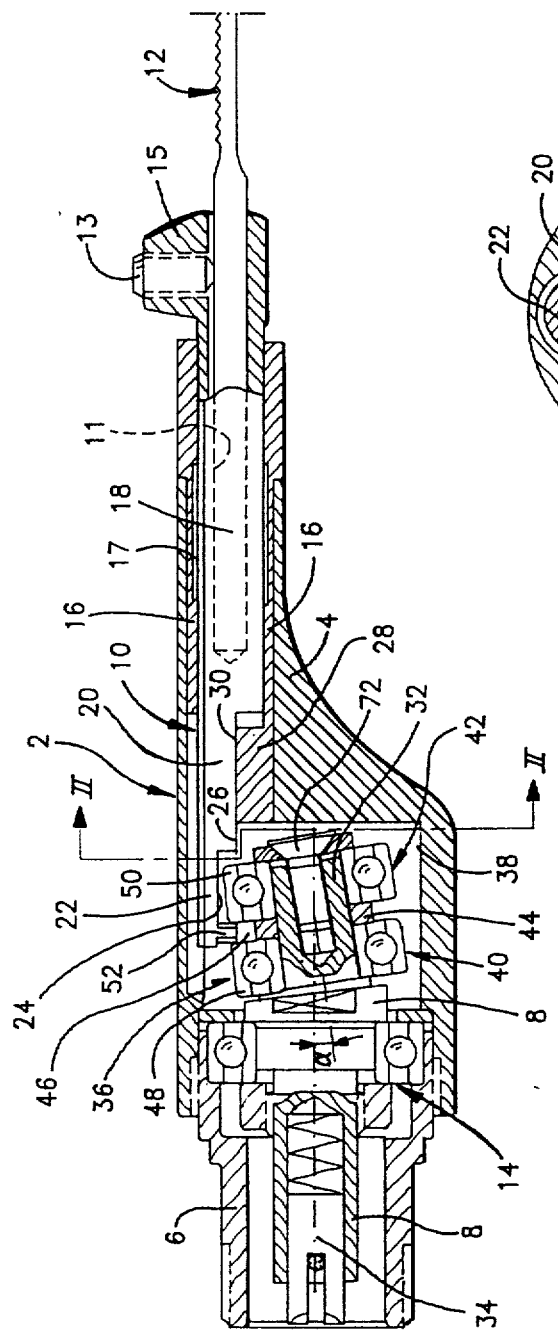
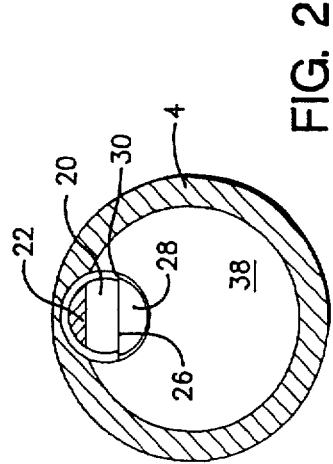
FIG. 1
FIG. 2